(12) United States Patent
Araki

(10) Patent No.: US 12,299,067 B2
(45) Date of Patent: May 13, 2025

(54) SPARSE MATRIX STANDARDIZATION DEVICE, SPARSE MATRIX STANDARDIZATION METHOD, SPARSE MATRIX STANDARDIZATION PROGRAM, AND DATA STRUCTURE

(71) Applicant: NEC Corporation, Tokyo (JP)

(72) Inventor: Takuya Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1021 days.

(21) Appl. No.: 17/298,291

(22) PCT Filed: Dec. 5, 2018

(86) PCT No.: PCT/JP2018/044765
§ 371 (c)(1),
(2) Date: May 28, 2021

(87) PCT Pub. No.: WO2020/115844
PCT Pub. Date: Jun. 11, 2020

(65) Prior Publication Data
US 2022/0050886 A1    Feb. 17, 2022

(51) Int. Cl.
*G06F 17/16*    (2006.01)
*G06F 7/499*    (2006.01)
(Continued)

(52) U.S. Cl.
CPC .......... *G06F 17/16* (2013.01); *G06F 7/49936* (2013.01); *G06F 17/18* (2013.01); *G06N 3/08* (2013.01)

(58) Field of Classification Search
CPC .......... G06F 17/16; G06F 17/18; G06F 30/27; G06F 7/49936; G06F 5/01; G06N 20/00; G06N 3/08
See application file for complete search history.

(56) References Cited

U.S. PATENT DOCUMENTS

2006/0064415 A1* 3/2006 Guyon .................. G16B 40/10
2016/0076970 A1   3/2016 Takahash

FOREIGN PATENT DOCUMENTS

JP    H09231366 A    9/1997
JP    2010078467 A    4/2010
(Continued)

OTHER PUBLICATIONS

Mathworks, "Matlab Documentation", selected sections from version R2016a, originally retrieved from https://web.archive.org/web/20160801192916/http://www.mathworks.com/help/matlab/index.html, dated from Jul. 2016 through Aug. 2016 (Year: 2016).*

(Continued)

*Primary Examiner* — Matthew D Sandifer

(57) ABSTRACT

A computation unit 11 performs, for each column of a target matrix to be standardized, a computation process to compute the average and standard deviation of the value of each component of the column. A first dividing unit 12 performs, for each column of the target matrix, a first dividing process to divide the value of each component of the column by the standard deviation computed based on the column. A second dividing unit 13 performs, for each column of the target matrix, a second dividing process to divide the average computed based on the column by the standard deviation computed based on the column. A generation unit 14 which arranges the quotients computed by a plurality of second dividing processes, in a row in the order of the columns of the target matrix from which the quotients are computed, thereby generating a row vector.

8 Claims, 12 Drawing Sheets

(51) Int. Cl.
*G06F 17/18* (2006.01)
*G06N 3/08* (2023.01)

(56) References Cited

FOREIGN PATENT DOCUMENTS

| | | |
|---|---|---|
| JP | 2011175540 A | 9/2011 |
| JP | 2015138462 A | 7/2015 |
| JP | 2016062258 A | 4/2016 |
| JP | 2018037020 A | 3/2018 |

OTHER PUBLICATIONS

International Search Report of PCT Application No. PCT/JP2018/044765 mailed on Mar. 12, 2019.
English translation of Written opinion for PCT Application No. PCT/JP2018/044765 mailed on Mar. 12, 2019.

\* cited by examiner

FIG. 4

| | | | $B^T$ | |
|---|---|---|---|---|
| -0.61 | -0.61 | -0.61 | -0.61 |
| -0.81 | -0.81 | -0.81 | -0.81 |
| -0.50 | -0.50 | -0.50 | -0.50 |
| -0.50 | -0.50 | -0.50 | -0.50 |
| -0.71 | -0.71 | -0.71 | -0.71 |
| -0.50 | -0.50 | -0.50 | -0.50 |
| -0.50 | -0.50 | -0.50 | -0.50 |

\*

F
| |
|---|
| $f_1$ |
| $f_2$ |
| $f_3$ |
| $f_4$ |

⇓

| |
|---|
| -0.61 |
| -0.81 |
| -0.50 |
| -0.50 |
| -0.71 |
| -0.50 |
| -0.50 |

\* $\Sigma f_i$
\* $\Sigma f_i$
...

FIG. 10

MATRIX
$$\begin{bmatrix} a_{11} & \cdots & a_{1n} \\ \vdots & \ddots & \vdots \\ a_{m1} & \cdots & a_{mn} \end{bmatrix}$$

COLUMN VECTOR $$\begin{pmatrix} b_1 \\ \cdot \\ \cdot \\ \cdot \\ b_n \end{pmatrix}$$

|  | WEIGHT | HEIGHT | ... |
|---|---|---|---|
| Mr. A | 25 | 125 | |
| Mr. B | 35 | 140 | |
| Mr. C | 25 | 130 | |
| Mr. D | 20 | 110 | |

AVERAGE : 26.25   126.25
STANDARD
DEVIATION : 6.29   12.5

⇒

P'

|  | WEIGHT | HEIGHT | ... |
|---|---|---|---|
| Mr. A | -0.2 | -0.1 | |
| Mr. B | 1.39 | 1.1 | |
| Mr. C | -0.2 | 0.3 | |
| Mr. D | -1.0 | -1.3 | |

(Background Art)

|  | this | is | a | pen | I | am | boy |
|---|---|---|---|---|---|---|---|
| this is a pen | 1 | 1 | 1 | 1 | | | |
| I am a boy | | | 1 | | 1 | 1 | 1 |
| ... | ... | | | | | | |

(Background Art)

|  | BOOK 1 | TEA | CONFECTIONERY | BOOK 2 | ... | | |
|---|---|---|---|---|---|---|---|
| Mr. E | 1 | 2 | 2 | | | | |
| Mr. F | | | 1 | 2 | 1 | 5 | 1 |
| ... | ... | | | | | | |

(Background Art)

(Background Art)

FIG. 15

COLUMN NUMBER

| | 0 | 1 | 2 | 3 | 4 | 5 | 6 |
|---|---|---|---|---|---|---|---|
| 0 | 1 | | 2 | | 3 | | |
| 1 | | 4 | | 5 | | | |
| 2 | 6 | 7 | | | | | 8 |
| 3 | | | | | 9 | 10 | |

ROW NUMBER

↓

COLUMN NUMBER

| | 0 | 1 | 2 | 3 | 4 | 5 | 6 |
|---|---|---|---|---|---|---|---|
| 0 | -0.26 | -0.81 | 1.50 | -0.50 | 0.00 | -0.50 | -0.50 |
| 1 | -0.61 | 0.37 | -0.50 | 1.50 | -0.71 | -0.50 | -0.50 |
| 2 | 1.48 | 1.25 | -0.50 | -0.50 | -0.71 | -0.50 | 1.50 |
| 3 | -0.61 | -0.81 | -0.50 | -0.50 | 1.41 | 1.50 | -0.50 |

ROW NUMBER (Background Art)

SPARSE MATRIX STANDARDIZATION DEVICE, SPARSE MATRIX STANDARDIZATION METHOD, SPARSE MATRIX STANDARDIZATION PROGRAM, AND DATA STRUCTURE

This application is a National Stage Entry of PCT/JP2018/044765 filed on Dec. 5, 2018, the contents of all of which are incorporated herein by reference, in their entirety.

TECHNICAL FIELD

The present invention relates to a sparse matrix standardization device, a sparse matrix standardization method, a sparse matrix standardization program, and a data structure.

BACKGROUND ART

In machine learning, training data is generally represented in a matrix form. In addition, in machine learning, an operation called standardization is often performed to align the size of each feature value in the training data.

The reason why standardization is often performed is that whether or not standardization is performed on the training data may have a significant impact on the performance of the learning algorithm that processes the training data. When standardization is performed, the following computations are performed for each feature value to be standardized.

$$z = (X-\mu)/\sigma \qquad \text{Equation (1)}$$

In Equation (1), X is a single feature value. Also, $\mu$ is the average of each feature value to be standardized. Also, $\sigma$ is the standard deviation of each feature value to be standardized. Also, z is one standardized feature value. In other words, standardization is performed so that the average of each feature value to be standardized is 0 and the variance of each feature value to be standardized is 1, respectively.

FIG. 11 is an explanatory diagram showing an example of standardization for training data expressed in matrix form. The left of FIG. 11 shows the training data P with the weight and height of each of Mr. A, Mr. B, Mr. C, and Mr. D as the feature values. The right of FIG. 11 shows the training data P' with the standardized feature values of the training data P.

As shown in the left of FIG. 11, the average of each weight is 26.25. Also, the standard deviation of each weight is about 6.29. As shown in the right of FIG. 11, the weight of Mr. A, for example, is standardized to (25-26.25)/6.29=-0.2 according to Equation (1). The weights of other people are computed and standardized in the same way. For each height, it is also computed and standardized in the same way as for weight.

In addition, training data of relatively large scale is often represented in sparse matrix form. A sparse matrix is a matrix in which most of the component values are zero. The basic computation in which a sparse matrix is used is the multiplication of the sparse matrix with a vector. Components with zero values are also referred to as "zero components". Components with non-zero values are also called "non-zero components".

For example, when the scope of machine learning becomes large, the scale of the training data also increases because various types of data are handled. However, the types of data related to a single training target sample are only a few of the types of data handled by the training data. Therefore, in machine learning where the scale of the target range is large, the training data is often represented in a sparse matrix form.

FIG. 12 is an explanatory diagram showing an example of training data represented in sparse matrix form. The training data Q shown in FIG. 12 has the number of times a word appears in a document as a feature value. The sparse matrix shown in FIG. 12 is manipulated in document analysis, such as looking for synonyms or similar documents.

Specifically, the training data Q is represented in matrix form, where the columns and rows represent "words" and "documents," respectively. The value of each component of the matrix is the number of times the word appeared in the document, as described above.

Each column of the matrix shown in FIG. 12 represents a word such as "this", "is", "a", "pen", "I", "am", "boy". Each row of the matrix shown in FIG. 12 represents a document such as "this is a pen" or "I am a boy".

As shown in FIG. 12, the value of each component corresponding to columns "this", "is", "a", and "pen" in the row showing the document "this is a pen" is "1". The value of each component corresponding to the columns "I", "am", and "boy" is "0".

In the sparse matrix shown in FIG. 12, "0" is not denoted. In the sparse matrix in this description, "0" shall not be denoted.

The value of each component in the row representing the document "I am a boy" is also determined in the same way as the value of each component in the row representing the document "this is a pen". As shown in FIG. 12, the training data Q is required to correspond to various types of documents. Therefore, the training data with the number of times a word appears in a document as a feature value is represented in a sparse matrix form.

FIG. 13 is an explanatory diagram showing another example of training data represented in sparse matrix form. The training data R shown in FIG. 13 has the number of times a purchase or other action has been made on an item as a feature value. The sparse matrix shown in FIG. 13 is manipulated by recommending an arbitrary item to the user.

Specifically, the training data R is represented in matrix form, where the columns and rows represent "item" and "user," respectively. The value of each component of the matrix are the number of times purchases, etc., have been made for the items, as described above.

Each column of the matrix shown in FIG. 13 indicates each item such as "Book 1", "Tea", "Confectionery", "Book 2", respectively. Each row of the matrix shown in FIG. 13 indicates each user, such as "Mr. E", "Mr. F".

As shown in FIG. 13, for example, the value of each component corresponding to columns "Book 1," "Tea," and "Confectionery" in the row indicating user "Mr. E" are "1," "2," and "2," respectively. The value of the component corresponding to the column "Book 2" is "0".

As shown in FIG. 13, the training data R is required to correspond to various types of items. Therefore, the training data with the number of times a purchase or other action was made on an item as a feature value is represented in a sparse matrix form.

One way to store the sparse matrix shown in FIGS. 12 and 13 is to skip the zero component and store the sparse matrix. In order to save the sparse matrix by skipping the zero component, it is required to format the sparse matrix into another form of data.

FIG. 14 is an explanatory diagram showing an example of a sparse matrix format. FIG. 14 shows a sparse matrix format by compressed row storage (CRS). When a sparse matrix is formatted by CRS, data containing values, offset data, and data containing column numbers are generated respectively, as shown in FIG. 14.

When formatting a sparse matrix, the CRS first extracts the value of each non-zero component of the sparse matrix along the dotted arrow shown in FIG. 14. Then, the CRS generates data containing the value of each extracted non-zero component. The data containing the values shown in FIG. 14 contains the value of each non-zero component in the order in which they were extracted along the dotted arrow.

Next, the CRS generates offset data that contains the number of the value of the first non-zero component of each row of the sparse matrix and the number of non-zero components in the sparse matrix. Specifically, "0", "3", "5", and "8" in the offset data shown in FIG. 14 are the numbers of the values of the first non-zero component of each row of the sparse matrix.

For example, "0" is the number in the data containing the value of "1", the value of the first non-zero component of the first row of the sparse matrix. Similarly, "3" is the number in the data containing the value of "4", the value of the first non-zero component of the second row of the sparse matrix. The numbers "5" and "8" are also defined in the same way. The "10" in the offset data shown in FIG. 14 is the number of non-zero components in the sparse matrix.

Next, the CRS generates data containing column numbers. For example, "0" is the column number in the sparse matrix of the component with value "1". Similarly, "2" is the column number in the sparse matrix of the component with the value "2". The other column numbers are also defined in the same way.

When the sparse matrix is formatted so that the zero component is skipped as shown in FIG. 14, the matrix form is no longer used, and the training data is stored efficiently. When training data is stored efficiently, storage space can be reduced and the computation of training data can be accelerated. There is also an efficient way to compute sparse matrix, depending on how the sparse matrix is formatted.

In addition, Patent Literatures (PTLs) 1-3 each describe contents related to matrix standardization. For example, PTL 1 describes an information processing device that reduces the amount of computation in the matching process in parallel process.

In addition, PTL 2 describes a relevance determination device that speeds up the determination of the relevance of such feature vectors and plural real vectors by speeding up the inner product computation of binary feature vectors and plural real vectors.

In addition, PTL 3 describes a pattern recognition method in which learning is performed in advance on multi-dimensional sample patterns with known classes, and the identification of which class the input pattern belongs to is based on the results of that learning.

CITATION LIST

Patent Literature

PTL 1: Japanese Patent Application Laid-Open No. 2018-037020
PTL 2: Japanese Patent Application Laid-Open No. 2015-138462
PTL 3: Japanese Patent Application Laid-Open No. Hei 09-231366

SUMMARY OF INVENTION

Technical Problem

The problem is that when a sparse matrix is standardized, it is converted into a dense matrix, which greatly reduces the computational efficiency. The reason for the problem is explained below with reference to FIG. 15.

FIG. 15 is an explanatory diagram showing an example of standardization of a sparse matrix. The sparse matrix shown in the upper of FIG. 15, when standardized, is converted to the dense matrix shown in the lower of FIG. 15. A dense matrix is a matrix in which most of the components are non-zero components.

The standardization shown in FIG. 15 is done using each column of the sparse matrix as a single unit. For example, the average of the value "1", "0", "6", and "0" for each component in column 0 of the sparse matrix shown in the upper of FIG. 15 is 1.75. The standard deviation of the value of each component is about 2.87.

Therefore, the value "1" of the component in column 0 of the sparse matrix shown in the upper of FIG. 15 is standardized to (1-1.75)/2.87 =−0.26 according to Equation (1). Similarly, the value "0" of the component in column 0 of the sparse matrix is standardized to (0-1.75)/2.87=−0.61 according to Equation (1). The value of each component of the other sparse matrix is computed and standardized in the same way.

The value of each component in the zero column of the matrix shown in the lower of FIG. 15 are "−0.26", "−0.61", "1.48", and "−0.61", respectively. The zero component that was present in the zero column of the sparse matrix shown in the upper of FIG. 15 is not present in the zero column of the matrix shown in the lower of FIG. 15.

In other words, the reason why sparse matrix is converted to dense matrix in standardization is that $\mu/\sigma$ is always subtracted even from zero components in order to align the average of the value of each component, which is a feature value, to zero. The zero component becomes a non-zero component when $\mu/\sigma$ is subtracted.

As described above, sparse matrix is converted to dense matrix because when standardized, the average divided by the standard deviation is subtracted from the zero component. When the form representing the training data is converted from the sparse matrix form to the dense matrix form, the sparse nature of the original training data is lost.

When the sparse nature is lost, more memory is required to store the training data, and the time required to compute the training data becomes longer. PTLs 1-3 do not describe how to standardize training data represented in sparse matrix form without losing the sparsity property.

Therefore, it is an object of the present invention to provide a sparse matrix standardization device, a sparse matrix standardization method, a sparse matrix standardization program, and a data structure that can standardize training data represented in sparse matrix form while preserving the sparse nature of the training data, which solves the above-mentioned problems.

Solution to Problem

A sparse matrix standardization device according to the present invention includes: a computation unit which performs, for each column of a target matrix to be standardized, a computation process to compute the average and standard deviation of the value of each component of the column; a first dividing unit which performs, for each column of the target matrix, a first dividing process to divide the value of each component of the column by the standard deviation computed on the basis of the column; a second dividing unit which performs, for each column of the target matrix, a second dividing process to divide the average computed on the basis of the column by the standard deviation computed on the basis of the column; and a generation unit which arranges the quotients computed by a plurality of second dividing processes, in a row in the order of the columns of the target matrix from which the quotients are computed, thereby generating a row vector.

A sparse matrix standardization device according to the present invention includes: a computation unit which performs, for each row of a target matrix to be standardized, a computation process to compute the average and standard deviation of the value of each component of the row; a first dividing unit which performs, for each row of the target matrix, a first dividing process to divide the value of each component of the row by the standard deviation computed on the basis of the row; a second dividing unit which performs, for each row of the target matrix, a second dividing process to divide the average computed on the basis of the row by the standard deviation computed on the basis of the row; and a generation unit which arranges the quotients computed by a plurality of second dividing processes, in a column in the order of the rows of the target matrix from which the quotients are computed, thereby generating a column vector.

A sparse matrix standardization device according to the present invention includes: a computation unit which performs, for each column of a target matrix to be standardized, a computation process to compute the average of the value of each component of the column; and a generation unit which arranges the averages computed by a plurality of computation processes, in a row in the order of the columns of the target matrix from which the averages are computed, thereby generating a row vector.

A sparse matrix standardization device according to the present invention includes: a computation unit which performs, for each row of a target matrix to be standardized, a computation process to compute the average of the value of each component of the row; and a generation unit which arranges the averages computed by a plurality of computation processes, in a column in the order of the rows of the target matrix from which the averages are computed, thereby generating a column vector.

A sparse matrix standardization method according to the present invention includes: performing, for each column of a target matrix to be standardized, a computation process to compute the average and standard deviation of the value of each component of the column; performing, for each column of the target matrix, a first dividing process to divide the value of each component of the column by the standard deviation computed on the basis of the column; performing, for each column of the target matrix, a second dividing process to divide the average computed on the basis of the column by the standard deviation computed on the basis of the column; and arranging the quotients computed by a plurality of second dividing processes, in a row in the order of the columns of the target matrix from which the quotients are computed, thereby generating a row vector.

A sparse matrix standardization method according to the present invention includes: performing, for each row of a target matrix to be standardized, a computation process to compute the average and standard deviation of the value of each component of the row; performing, for each row of the target matrix, a first dividing process to divide the value of each component of the row by the standard deviation computed on the basis of the row; performing, for each row of the target matrix, a second dividing process to divide the average computed on the basis of the row by the standard deviation computed on the basis of the row; and arranging the quotients computed by a plurality of second dividing processes, in a column in the order of the rows of the target matrix from which the quotients are computed, thereby generating a column vector.

A sparse matrix standardization program according to the present invention that causes a computer to perform processing includes: computation process for performing, for each column of a target matrix to be standardized, a process to compute the average and standard deviation of the value of each component of the column; first dividing process for performing, for each column of the target matrix, a process to divide the value of each component of the column by the standard deviation computed on the basis of the column; second dividing process for performing, for each column of the target matrix, a process to divide the average computed on the basis of the column by the standard deviation computed on the basis of the column; and generation process for arranging the quotients computed by the second dividing process, in a row in the order of the columns of the target matrix from which the quotients are computed, thereby generating a row vector.

A sparse matrix standardization program according to the present invention that causes a computer to perform processing includes: computation process for performing, for each row of a target matrix to be standardized, a process to compute the average and standard deviation of the value of each component of the row; first dividing process for performing, for each row of the target matrix, a process to divide the value of each component of the row by the standard deviation computed on the basis of the row; second dividing process for performing, for each row of the target matrix, a process to divide the average computed on the basis of the row by the standard deviation computed on the basis of the row; and generation process for arranging the quotients computed by the second dividing process, in a column in the order of the rows of the target matrix from which the quotients are computed, thereby generating a column vector.

A data structure according to the present invention includes: a matrix generated by, for each column of a target matrix to be standardized, computation process to be performed to compute the average and standard deviation of the value of each component of the column, and first dividing process to be performed to divide the value of each component of the column by the standard deviation computed on the basis of the column; and a row vector generated by quotients computed by performing, for each column of the target matrix, the second dividing process to divide the average computed on the basis of the column by the standard deviation computed on the basis of the column arranged in a row in the order of the columns of the target matrix from which the quotients are computed.

A data structure according to the present invention includes: a matrix generated by, for each row of a target matrix to be standardized, computation process to be performed to compute the average and standard deviation of the value of each component of the row, and first dividing process to be performed to divide the value of each component of the row by the standard deviation computed on the basis of the row; and a column vector generated by quotients computed by performing, for each row of the target matrix, the second dividing process to divide the average computed on the basis of the row by the standard deviation computed on the basis of the row arranged in a column in the order of the rows of the target matrix from which the quotients are computed.

Advantageous Effects of Invention

According to the present invention, training data represented in sparse matrix form can be standardized while preserving the sparse nature of the training data.

BRIEF DESCRIPTION OF DRAWINGS

FIG. 4 is an explanatory diagram showing another example of a computation on a standardized sparse matrix by the computation unit 140.

FIG. 10 is a block diagram showing another outline of a data structure according to the present invention.

FIG. 11 is an explanatory diagram showing an example of standardization for training data expressed in matrix form.

FIG. 12 is an explanatory diagram showing an example of training data represented in sparse matrix form.

FIG. 13 is an explanatory diagram showing another example of training data represented in sparse matrix form.

FIG. 15 is an explanatory diagram showing an example of standardization of a sparse matrix.

DESCRIPTION OF EMBODIMENTS

Exemplary Embodiment 1

[Description of Configuration]

Figure 1:
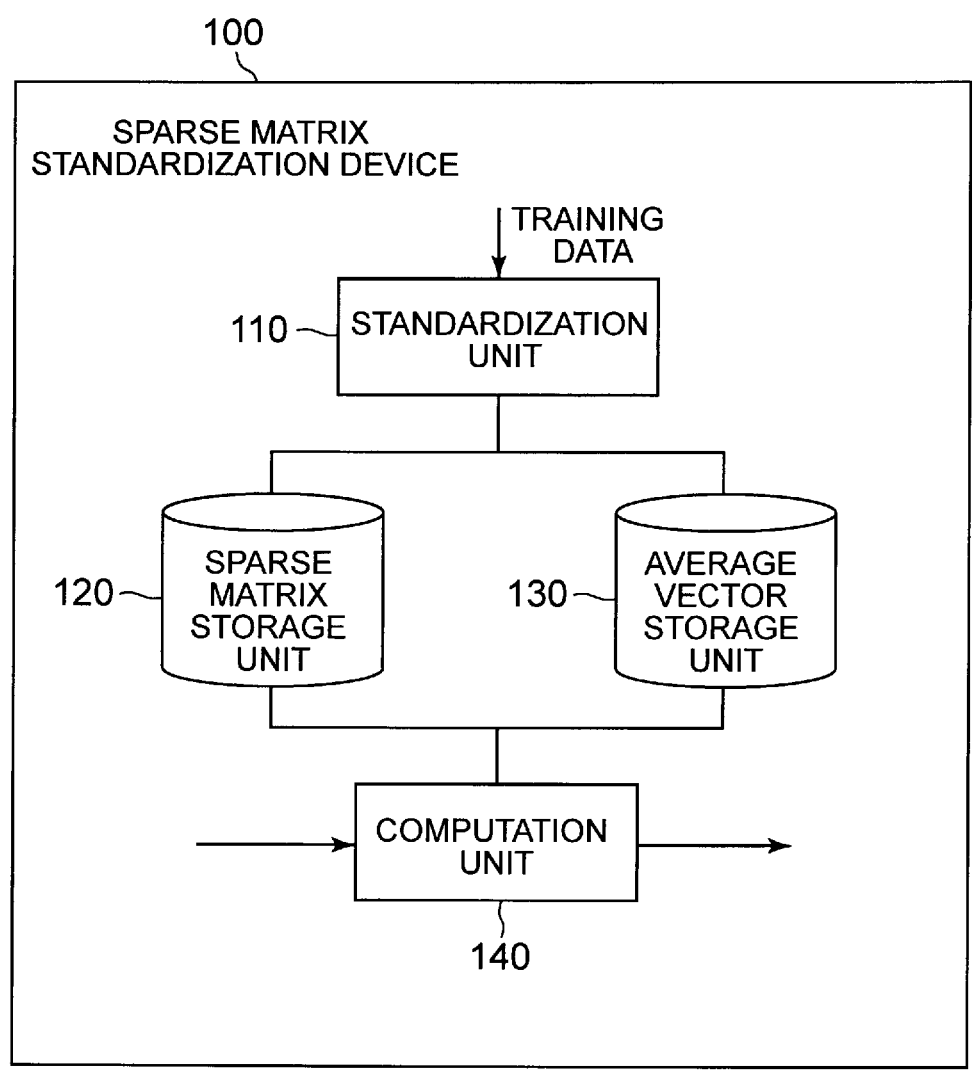
FIG. 1 is a block diagram showing a configuration example of a sparse matrix standardization device according to a first exemplary embodiment of the present invention.

Exemplary embodiments of the present invention are described below with reference to the drawings. FIG. 1 is a block diagram showing a configuration example of a sparse matrix standardization device according to a first exemplary embodiment of the present invention.

The sparse matrix standardization device 100 according to the present exemplary embodiment adds a new format of sparse matrix and vector in the standardization so that training data represented in sparse matrix form does not lose its sparse nature when it is standardized.

As shown in FIG. 1, the sparse matrix standardization device 100 according to the present exemplary embodiment includes a standardization unit 110, a sparse matrix storage unit 120, an average vector storage unit 130, and a computation unit 140.

Figure 2:
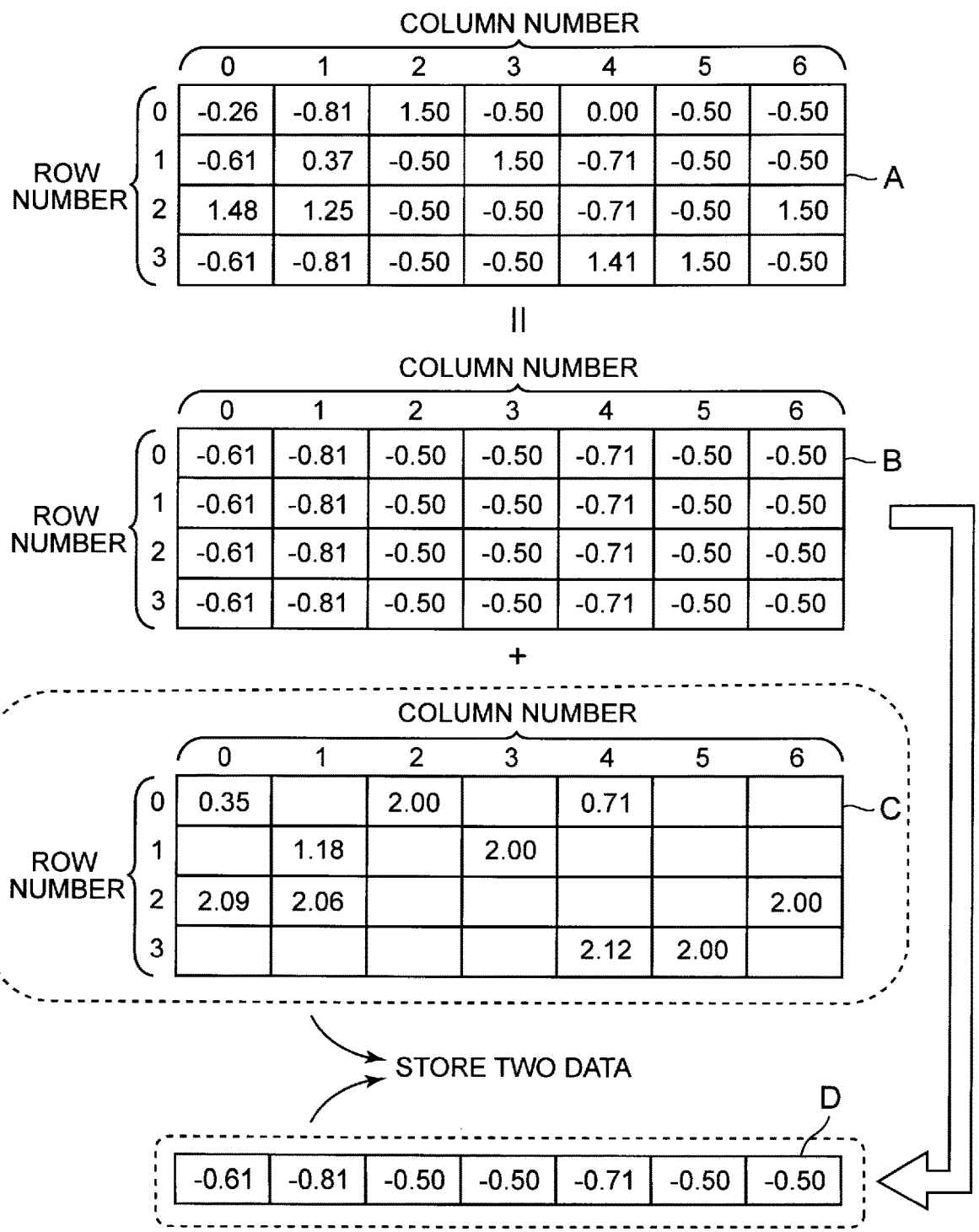
FIG. 2 is an explanatory diagram showing an example of the standardization of a sparse matrix by a standardization unit 110.

The standardization unit 110 has the function of standardizing the training data represented in sparse matrix form. FIG. 2 is an explanatory diagram showing an example of the standardization of a sparse matrix by the standardization unit 110.

Matrix A, shown in FIG. 2, is a general standardized sparse matrix shown in the lower of FIG. 15. As shown in FIG. 2, matrix A can be separated into matrix B, which is a dense matrix, and matrix C, which is a sparse matrix. In other words, matrix A is regarded as the sum of matrix B and matrix C.

The value of each column component of matrix B is the negative value of $\mu/\sigma$ subtracted from the zero component of each column of the sparse matrix by general standardization. For example, the value of each component in column 0 of matrix B is −0.61, computed above.

The value of each component in each column of matrix C is the difference between the value of each component in each column of the corresponding matrix A and the value of each component in each column of the corresponding matrix B. For example, the values of "0.35", "0", "2.09", and "0" for each component in column 0 of matrix C are the difference between the values of "−0.26", "−0.61", "1.48", and "−0.61" for each component in column 0 of matrix A and the value of "−0.61" for each component in column 0 of matrix B, respectively.

That is, the value y of a component of matrix C is obtained by using the value z of the corresponding component of matrix A, and the value x of the corresponding component of the matrix before matrix A is standardized, as follows.

$$y = z - (-\mu/\sigma) = (x-\mu)/\sigma + \mu/\sigma = x/\sigma \qquad \text{Equation (2)}$$

Therefore, the standardization unit 110 can generate matrix C by dividing the value of each component of each column of the sparse matrix before matrix A is standardized by each standard deviation obtained for each column respectively.

The matrix B can be converted into the row vector D shown in FIG. 2. The reason for this is that, as shown in FIG. 2, the value of each component of each row of matrix B are the same for all rows. In other words, it is because the fact that only one of the rows of matrix B is preserved is equivalent to the fact that matrix B is preserved.

Therefore, the standardization unit 110 generates a row vector D that corresponds to one of the rows of matrix B. Hereafter, row vector D is also referred to as the average vector. Matrix A, which is standardized sparse matrix in the present exemplary embodiment, consists of matrix C and row vector D.

To summarize the above process, in standardizing the sparse matrix, the standardization unit 110 performs, for each column of a target matrix to be standardized, a computation process to compute the average and standard deviation of the value of each component of the column. Next, the standardization unit 110 performs, for each column of the target matrix, a first dividing process to divide the value of each component of the column by the standard deviation computed on the basis of the column.

Next, the standardization unit 110 performs, for each column of the target matrix, a second dividing process to divide the average computed on the basis of the column by the standard deviation computed on the basis of the column. Next, the standardization unit 110 arranges the values obtained by multiplying the quotients computed by a plurality of second dividing processes by −1, in a row in the order of the columns of the target matrix from which the quotients are computed, thereby generating a row vector.

The standardization unit 110 may arrange the quotients computed by a plurality of second dividing processes, in a row in the order of the columns of the target matrix from which the quotients are computed, thereby generating a row vector.

The sparse matrix storage unit 120 has the function of storing the generated sparse matrix, matrix C. The average vector storage unit 130 has the function of storing the row vector D, which is the generated average vector. The format of the matrix C to be stored by the sparse matrix storage unit 120 and the row vector D to be stored by the average vector storage unit 130 are both not particularly limited.

As described above, the standardization unit 110 uses data consisting of a matrix generated by performing a plurality of first dividing processes and the generated row vector mentioned above, as standardization data, which is data in which the target matrix has been standardized. The standardization unit 110 stores the standardization data in the sparse matrix storage unit 120 and the average vector storage unit 130.

The computation unit 140 has the function of performing computations on sparse matrix. As mentioned above, computations on sparse matrix are basically multiplications with vector. The learning algorithm also basically uses multiplication of sparse matrix and vector.

Figure 3:
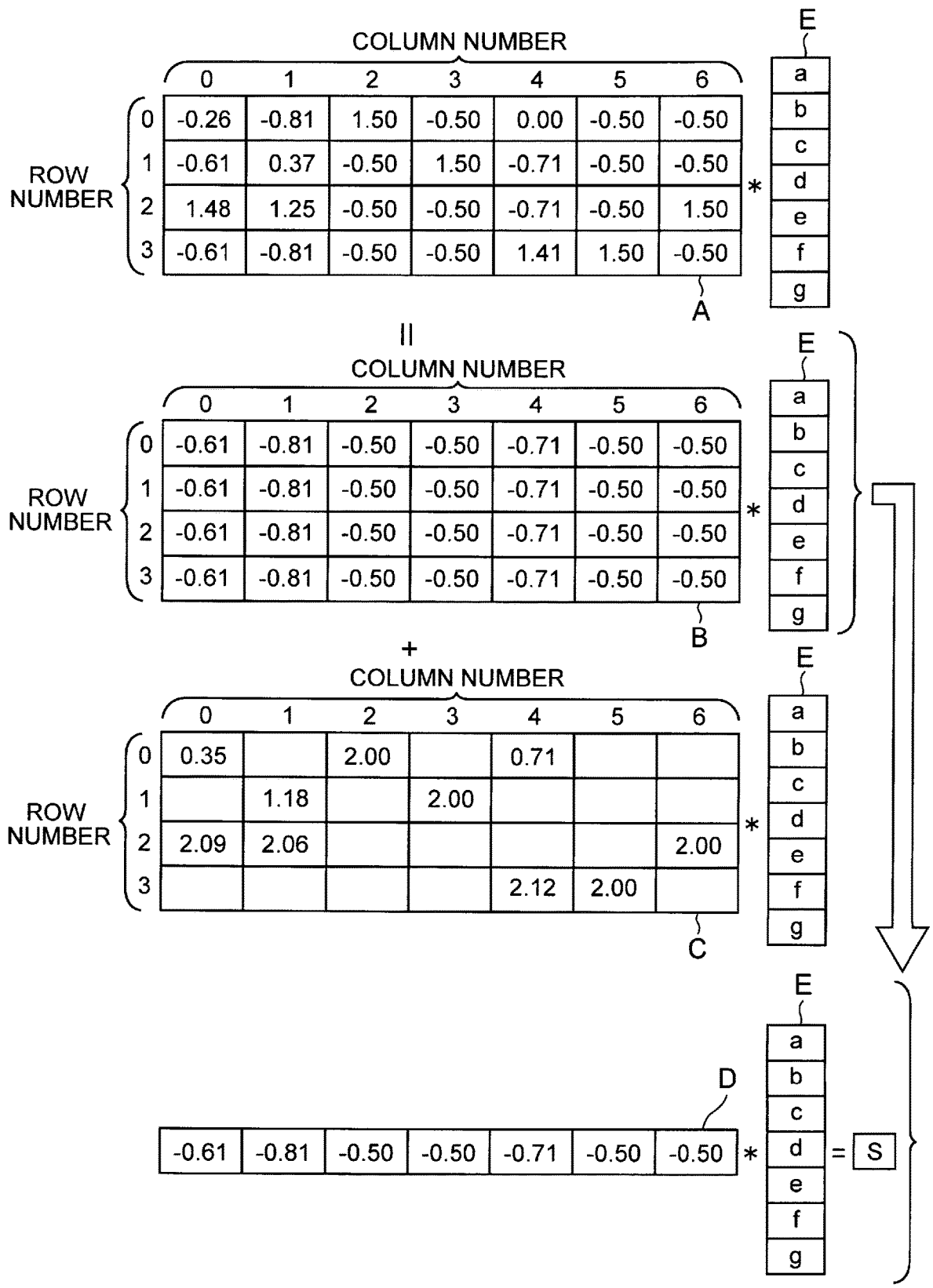
FIG. 3 is an explanatory diagram showing an example of a computation on a standardized sparse matrix by a computation unit 140.

For example, consider the case where a request to obtain the product of a standardized sparse matrix and a vector is input to the sparse matrix standardization device 100. FIG. 3 is an explanatory diagram showing an example of a computation on a standardized sparse matrix by the computation unit 140.

The first from the top of FIG. 3 shows the multiplication of matrix A which is the standardized sparse matrix and column vector E. In keeping with FIG. 2, the multiplication of matrix A with column vector E can be separated into the multiplication of matrix B with column vector E and the multiplication of matrix C with column vector E.

The second from the top of FIG. 3 shows the multiplication of matrix B with column vector E. The third from the top of FIG. 3 shows the multiplication of matrix C with column vector E, that is the multiplication of a sparse matrix with a vector. The product of matrix C and column vector E is a four-by-one matrix (column vector).

Furthermore, in keeping with FIG. 2, the multiplication of matrix B with column vector E can be converted to the multiplication of row vector D with column vector E. The fourth from the top of FIG. 3 shows the multiplication of row vector D with column vector E. As shown in the fourth from the top of FIG. 3, the product of row vector D and column vector E (dot product) results in a single scalar value S.

Therefore, the computation unit 140 converts the multiplication of the standardized sparse matrix and vector indicated by the input request, as shown in FIG. 3. Specifically, when a request for the product of matrix A and column vector E is input, the computation unit 140 first obtains the product of matrix C and column vector E, and the product of row vector D and column vector E, respectively.

Next, the computation unit 140 adds the scalar value S, which is the product of the row vector D and the column vector E, to the value of each component of the column vector, which is the product of the matrix C and the column vector E, respectively. The column vector in which the scalar value S is added to each of the value of each component is the product of the obtained matrix A and the column vector E.

When computing the product of a standardized sparse matrix and a dense matrix, the computation unit 140 repeatedly executes the process of computing a new column vector by adding the scalar value shown in the fourth from the top of FIG. 3 to the value of each component of the column vector that is the product of multiplication shown in the third from the top of FIG. 3, over each column vector that consists of the dense matrix. This is because a matrix that is the product of a sparse matrix and a dense matrix can be considered as a set of column vectors that are the product of a sparse matrix and a column vector.

To summarize the above process, the computation unit 140 computes the product of the standardized sparse matrix and the first column vector, computes the second column vector, which is the product of the matrix included the standardized sparse matrix and the first column vector, and computes the scalar value, which is the product of the row vector included the standardized sparse matrix and the first column vector.

Next, the computation unit 140 adds the computed scalar value to the value of each component of the computed second column vector, and outputs the second column vector with the scalar value added to the value of each component as a product of the standardized sparse matrix and the first column vector.

When the row vector is generated by arranging each quotient horizontally in the order of the columns of the target matrix from which each quotient is computed, the computation unit 140 subtracts the computed scalar value from the value of each component of the computed second column vector. The computation unit 140 outputs the second column vector, in which the scalar value is subtracted from the value of each component, as the product of the standardization data and the first column vector.

As described above, if the average vector is stored as separate data, the sparse matrix can be standardized without losing its properties as a sparse matrix.

In the present exemplary embodiment, we have described an example where each column of the sparse matrix is the unit of standardization. However, the unit of standardization can also be each row of the sparse matrix.

Even when standardization is performed where each row of the sparse matrix is the unit of standardization, the standardization unit 110 can generate the sparse matrix and the average vector in the same way as the example shown in FIG. 2. When each row of the sparse matrix is the unit of standardization, the standardization unit 110 generates a column vector instead of a row vector as the average vector.

The sparse matrix is also often transposed and used. When standardization is performed where each column of the transposed sparse matrix is a unit, the standardization unit 110 generates a column vector as the average vector, just as if each row of the sparse matrix were a unit of standardization.

FIG. 4 is an explanatory diagram showing another example of a computation on a standardized sparse matrix by the computation unit 140. The multiplication of matrix $B^T$ and column vector F shown in the upper of FIG. 4 corresponds to the multiplication shown in the second from the top of FIG. 3 when the product of matrix $A^T$, which is the transpose matrix of standardized matrix A, and column vector F is obtained. In other words, the matrix B used in the multiplication shown in the second from the top of FIG. 3 is converted to the transposed matrix, matrix $B^T$, as shown in the upper of FIG. 4.

The multiplication of the matrix $B^T$ and the column vector F shown in the upper of FIG. 4 can be converted to the multiplication of the column vector and the scalar value shown in the lower of FIG. 4. The multiplication between column vector and scalar value shown in the lower of FIG.

4 corresponds to the multiplication shown in the fourth from the top of FIG. 3 when the product of matrix $A^T$ and column vector F is obtained.

For example, the dot product between the first row of the matrix $B^T$ and the column vector F is the product of the sum of the value of each component of the column vector F ($\Sigma f_i$) and −0.61. The dot product between the other row of the matrix $B^T$ and the column vector F is obtained in the same way.

The computation unit 140 adds the column vector, which is the product of the multiplication shown in the lower of FIG. 4, and the column vector, which is the product of the sparse matrix $C^T$ generated by the standardization unit 110 and the column vector F. The sum of the two column vectors is the product of the obtained matrix $A^T$ and the column vector F.

The structure of the sparse matrix $C^T$ generated by the standardization unit 110 is the same as the structure of the sparse matrix generated by the standardization unit 110 when the input sparse matrix is standardized row by row.

As a variation of the present exemplary embodiment, it is possible that the standardization unit 110 does not transform each component of the sparse matrix to be standardized in any way. The standardization unit 110 performs, for each column of the sparse matrix to be standardized, a computation process to compute the average of the value of each component of the column.

Next, the standardization unit 110 arranges the averages computed by a plurality of computation processes, in a row in the order of the columns of the sparse matrix to be standardized from which the averages are computed, thereby generating a row vector.

In the case of the above variation, the standardization unit 110 uses the data consisting of the matrix to be standardized and the generated row vector as the standardization data, which is the data in which the target matrix has been standardized. The standardization unit 110 stores the standardization data in the sparse matrix storage unit 120 and the average vector storage unit 130. If each row of the sparse matrix is the unit of standardization, the standardization unit 110 performs the same process.

[Description of Operation]

Figure 5:
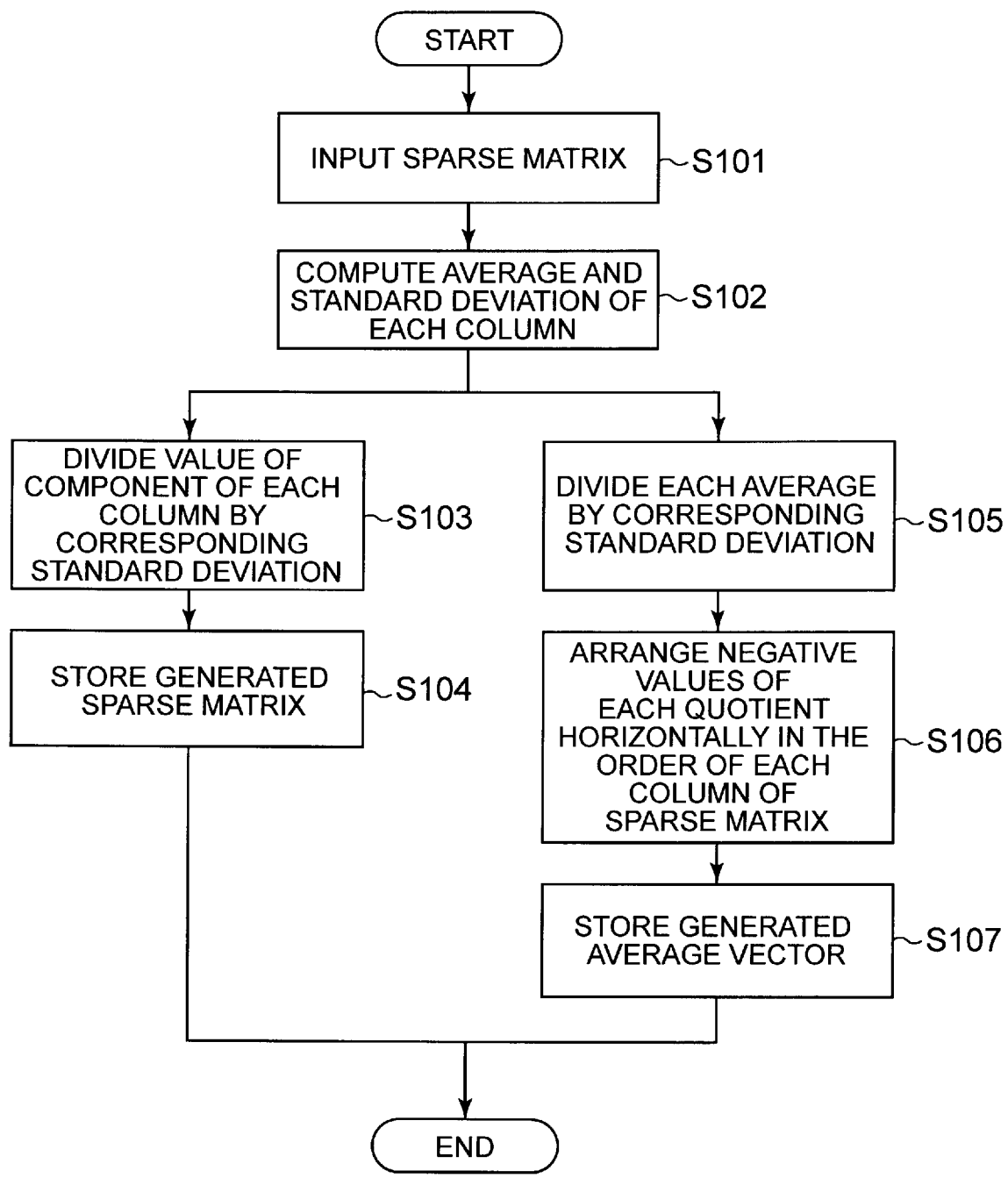
FIG. 5 is a flowchart showing an operation of a standardization process by a sparse matrix standardization device 100 of the first exemplary embodiment.

An operation to perform standardization on a sparse matrix of the sparse matrix standardization device 100 according to the present exemplary embodiment is described below with reference to FIG. 5. FIG. 5 is a flowchart showing an operation of a standardization process by the sparse matrix standardization device 100 of the first exemplary embodiment.

First, a sparse matrix to be standardized is input to the sparse matrix standardization device 100 (Step S101). The sparse matrix to be standardized is input to the standardization unit 110.

Next, the standardization unit 110 computes the average and standard deviation of the value of each component of any one column of the input sparse matrix, respectively. The standardization unit 110 performs the process of computing the average and standard deviation over all the columns of the sparse matrix (step S102).

Next, the standardization unit 110 divides the value of each component of any one column of the input sparse matrix by the standard deviation computed on the basis of the value of each of its component in step 5102, respectively. The standardization unit 110 performs the process of dividing the value of each component of the column by the standard deviation over all the columns of the sparse matrix (Step S103).

By performing the process in step S103, a new sparse matrix (for example, sparse matrix C) is generated. The standardization unit 110 stores the generated sparse matrix in the sparse matrix storage unit 120 (step S104).

Independently of the process in step S103, the standardization unit 110 divides the average computed in step S102 on the basis of any one column of the input sparse matrix by the standard deviation computed in step S102 on the basis of the any one column. The standardization unit 110 performs the process of dividing the average by the standard deviation over all the columns of the sparse matrix (step S105).

Next, the standardization unit 110 arranges the negative values of each quotient, which is the result of each average obtained in step S105 being divided by each standard deviation, horizontally in the order of each column of the sparse matrix from which each quotient is computed (step S106).

By executing the process in step S106, a new average vector (for example, row vector D) is generated. The standardization unit 110 stores the generated average vector in the average vector storage unit 130 (step S107).

After storing the average vector, the sparse matrix standardization device 100 ends the standardization process. The sparse matrix standardized in this process consists of the sparse matrix generated in step S103 and the average vector generated in step S106.

Figure 6:
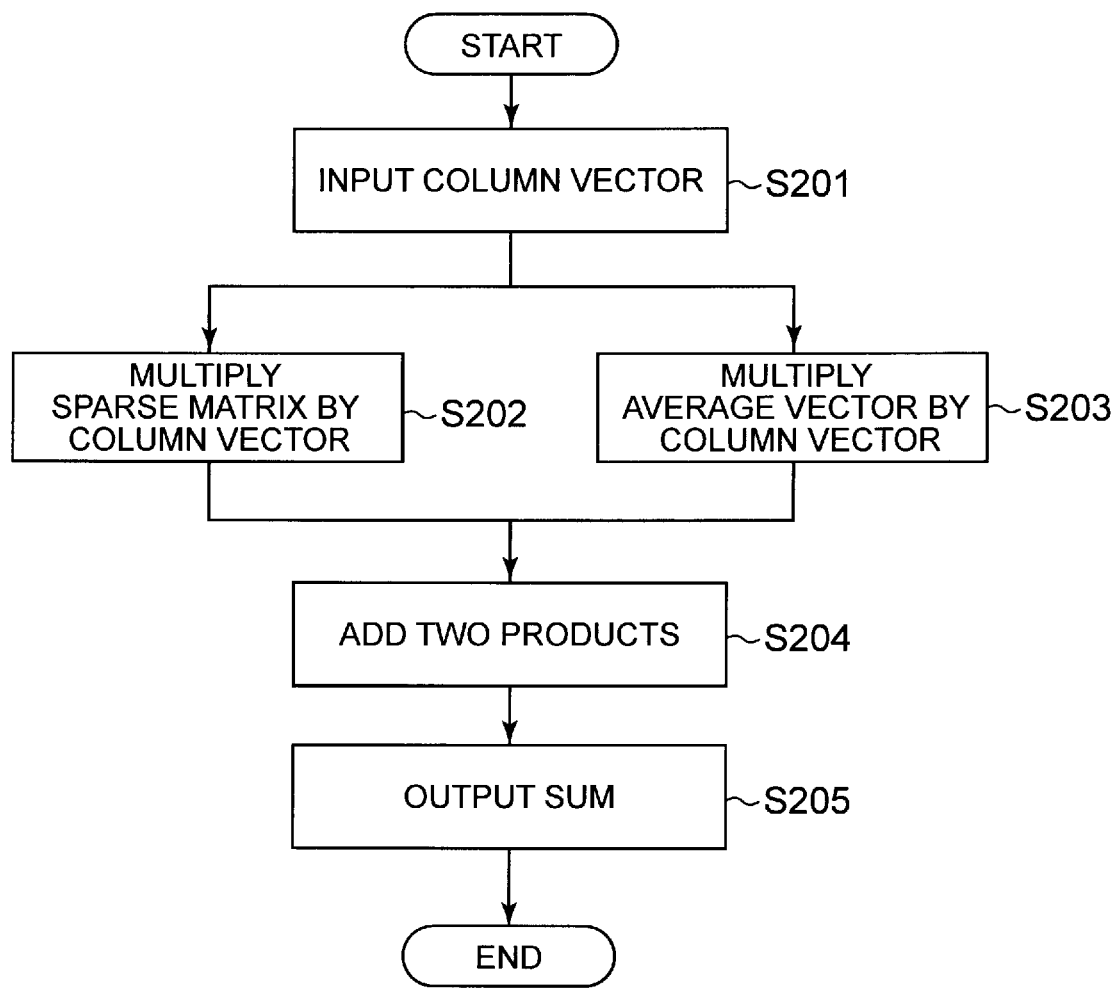
FIG. 6 is a flowchart showing an operation of a multiplication process by the sparse matrix standardization device 100 of the first exemplary embodiment.

Next, an operation to perform a multiplication process between the standardized sparse matrix and the vector of the sparse matrix standardization device 100 according to the present exemplary embodiment is described with reference to FIG. 6. FIG. 6 is a flowchart showing an operation of the multiplication process by the sparse matrix standardization device 100 of the first exemplary embodiment.

First, a column vector to be multiplied by the standardized sparse matrix is input to the sparse matrix standardization device 100 (step S201). The column vector to be multiplied is input to the computation unit 140.

Next, the computation unit 140 multiplies the sparse matrix stored in the sparse matrix storage unit 120, which consists of the standardized sparse matrix by the input column vector (Step S202).

Independently of the process in step S202, the computation unit 140 multiplies the average vector stored in the average vector storage unit 130, which consists of the standardized sparse matrix by the input column vector (step S203).

Next, the computation unit 140 adds the scalar value, which is the product of the average vector (row vector) and the column vector obtained in step S203, to the value of each component of the column vector, which is the product of the sparse matrix and the column vector obtained in step S202, respectively (step S204).

Next, the computation unit 140 outputs the column vector obtained in step S204 as a product of the standardized sparse matrix and the input column vector (step S205). After the output, the sparse matrix standardization device 100 ends the multiplication process.

[Effects of Invention]

The sparse matrix standardization device 100 according to the present exemplary embodiment can standardize training data represented in sparse matrix form while preserving the sparse nature of the training data.

The reason for this is that the standardization unit 110 separates the sparse matrix from the standardized sparse matrix and generates an average vector based on the matrix where $-\mu/\sigma$ is the value of the component, which is different for each column separated from the standardized matrix.

In addition, the computation unit 140 converts the multiplication of the standardized sparse matrix and vector into the multiplication of the generated sparse matrix and vector and the multiplication of the generated average vector and vector. Thus, the sparse matrix standardization device 100 can also perform the multiplication of the standardized sparse matrix and vector while preserving the sparse nature of the training data.

Figure 7:
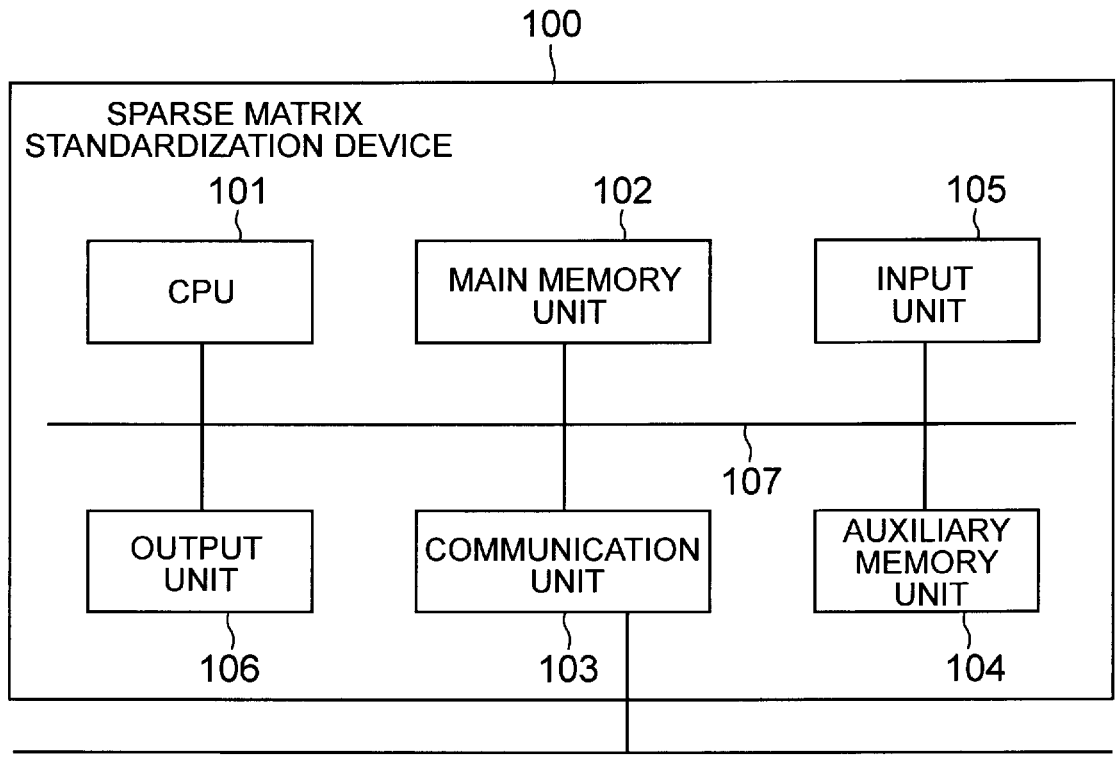
FIG. 7 is an explanatory diagram showing a hardware configuration example of the sparse matrix standardization device 100 according to the present invention.

A specific example of a hardware configuration of the sparse matrix standardization device 100 according to the present exemplary embodiment is described below. FIG. 7 is an explanatory diagram showing a hardware configuration example of the sparse matrix standardization device 100 according to the present invention.

The sparse matrix standardization device 100 shown in FIG. 7 includes a central processing unit (CPU) 101, a main memory unit 102, a communication unit 103, and an auxiliary memory unit 104. Furthermore, an input unit 105 that is operated by a user or an output unit 106 that presents a processing result or a progress of processing content to a user may be included.

The sparse matrix standardization device 100 is implemented by software, by the CPU 101 shown in FIG. 7 executing a program for providing functions of respective components.

In other words, the CPU 101 loads a program stored in the auxiliary memory unit 104 into the main memory unit 102 and executes the program to control an operation of the sparse matrix standardization device 100. Therefore, respective functions are implemented by software.

The sparse matrix standardization device 100 shown in FIG. 7 may include a DSP (Digital Signal Processor) instead of the CPU 101. Alternatively, the sparse matrix standardization device 100 shown in FIG. 7 may include the CPU 101 and the DSP.

The main memory unit 102 is used as a working area of data or a temporary saving area of data. The main memory unit 102 is, for example, a random access memory (RAM). The sparse matrix storage unit 120 and the average vector storage unit 130 may be implemented by the main memory unit 102.

The communication unit 103 has a function of inputting and outputting data to/from a peripheral device via a wired network or a wireless network (an information communication network).

The auxiliary memory unit 104 is non-transitory tangible storage media. Examples of a non-transitory tangible storage medium include a magnetic disk, a magneto-optical disk, a compact disk read-only memory (CD-ROM), a digital versatile disk read-only memory (DVD-ROM), and a semiconductor memory.

The input unit 105 has a function of inputting data or a processing command. The input unit 105 is input devices such as keyboards or mouses.

The output unit 106 has a function of outputting data. The output unit 106 is display devices such as liquid crystal display devices, or printing devices such as printers.

Furthermore, as shown in FIG. 7, respective components in the sparse matrix standardization device 100 are connected to a system bus 107.

The auxiliary memory unit 104 stores, for example, a program for implementing the standardization unit 110 and the computation unit 140.

The sparse matrix standardization device 100 may be implemented by hardware. For example, the sparse matrix standardization device 100 may be provided with a circuit including hardware components such as an LSI (Large Scale Integration) implementing a function as shown in FIG. 1.

Some or all of the components may be implemented by a general purpose circuit (circuitry), a dedicated circuit, a processor, or any combination thereof. These components may be composed of a single chip (for example, the LSI described above) or a plurality of chips connected via a bus. Some or all of the components may be implemented by a combination of, for example, the above-described circuit and program.

When some or all of the components are implemented by, for example, a plurality of information processing devices or circuits, the plurality of information processing devices or circuits may be centralized or distributed. For example, the information processing device or circuit may be implemented as a client and server system or a cloud computing system, each component of which is connected via a communication network.

Figure 8:
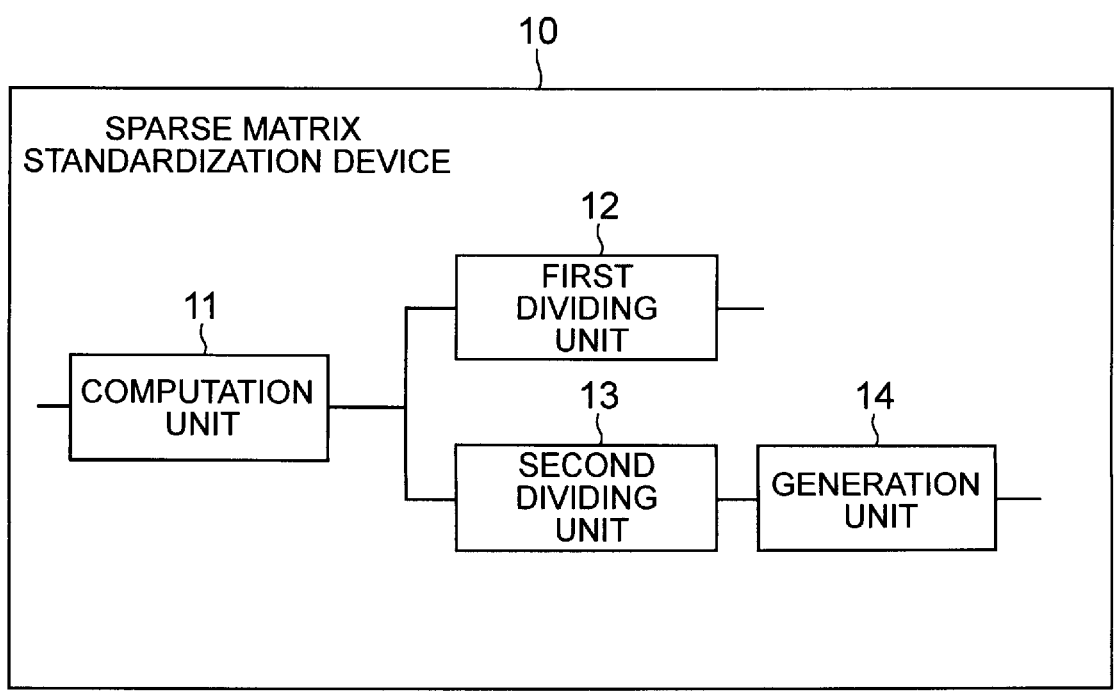
FIG. 8 is a block diagram showing an outline of a sparse matrix standardization device according to the present invention.

Next, an outline of the present invention is described. FIG. 8 is a block diagram showing an outline of a sparse matrix standardization device according to the present invention. The sparse matrix standardization device 10 according to the present invention includes a computation unit 11 (for example, the standardization unit 110) that performs, for each column of a target matrix to be standardized, a computation process to compute the average and standard deviation of the value of each component of the column; a first dividing unit 12 (for example, the standardization unit 110) that performs, for each column of the target matrix, a first dividing process to divide the value of each component of the column by the standard deviation computed on the basis of the column; a second dividing unit 13 (for example, the standardization unit 110) that performs, for each column of the target matrix, a second dividing process to divide the average computed on the basis of the column by the standard deviation computed on the basis of the column; and a generation unit 14 (for example, the standardization unit 110) that arranges the quotients computed by a plurality of second dividing processes, in a row in the order of the columns of the target matrix from which the quotients are computed, thereby generating a row vector.

With such a configuration, the sparse matrix standardization device can standardize training data represented in sparse matrix form while preserving the sparse nature of the training data.

Furthermore, the sparse matrix standardization device 10 may include a storage unit (for example, the sparse matrix storage unit 120 and the average vector storage unit 130) that stores data consisting of a matrix generated by performing a plurality of first dividing processes and the generated row vector, as standardization data, which is data in which the target matrix has been standardized.

With such a configuration, the sparse matrix standardization device can manage standardization data consisting of a sparse matrix and a row vector.

Furthermore, the sparse matrix standardization device 10 may include a computation unit (for example, the computation unit 140) that computes the product of the standardization data and the first column vector. The computation unit may perform: computing the second column vector, which is the product of the matrix included the standardization data and the first column vector; computing the scalar value, which is the product of the row vector included the standardization data and the first column vector; subtracting the computed scalar value from the value of each component of the computed second column vector; and outputting the second column vector, in which the scalar value is subtracted from the value of each component, as the product of the standardization data and the first column vector.

With such a configuration, the sparse matrix standardization device can perform computations on the standardized training data by taking advantage of its sparse nature.

Furthermore, each component of the sparse matrix standardization device 10 shown in FIG. 8 may operate as follows. For example, the computation unit 11 performs, for each row of a target matrix to be standardized, a computation process to compute the average and standard deviation of the value of each component of the row. Moreover, the first dividing unit 12 performs, for each row of the target matrix, a first dividing process to divide the value of each component of the row by the standard deviation computed on the basis of the row.

Moreover, the second dividing unit 13 performs, for each row of the target matrix, a second dividing process to divide the average computed on the basis of the row by the standard deviation computed on the basis of the row. Moreover, the generation unit 14 arranges the quotients computed by a plurality of second dividing processes, in a column in the order of the rows of the target matrix from which the quotients are computed, thereby generating a column vector.

Moreover, the storage unit stores data consisting of a matrix generated by performing a plurality of first dividing processes and the generated column vector, as standardization data, which is data in which the target matrix has been standardized.

Moreover, the computation unit computes the second column vector, which is the product of the matrix included the standardization data and the first column vector, computes a third column vector in which each product of the value of each component of the column vector included the standardization data multiplied by −1 and the sum of the value of each component of the first column vector is the value of each component, and outputs the sum of the computed second column vector and the computed third column vector as the product of the standardization data and the first column vector.

Furthermore, each component of the sparse matrix standardization device 10 shown in FIG. 8 may operate as follows. For example, the computation unit 11 performs, for each column of a target matrix to be standardized, a computation process to compute the average of the value of each component of the column. Moreover, the generation unit 14 arranges the averages computed by a plurality of computation processes, in a row in the order of the columns of the target matrix from which the averages are computed, thereby generating a row vector.

Furthermore, each component of the sparse matrix standardization device 10 shown in FIG. 8 may operate as follows. For example, the computation unit 11 performs, for each row of a target matrix to be standardized, a computation process to compute the average of the value of each component of the row. Moreover, the generation unit 14 arranges the averages computed by a plurality of computation processes, in a column in the order of the rows of the target matrix from which the averages are computed, thereby generating a column vector.

Figure 9:
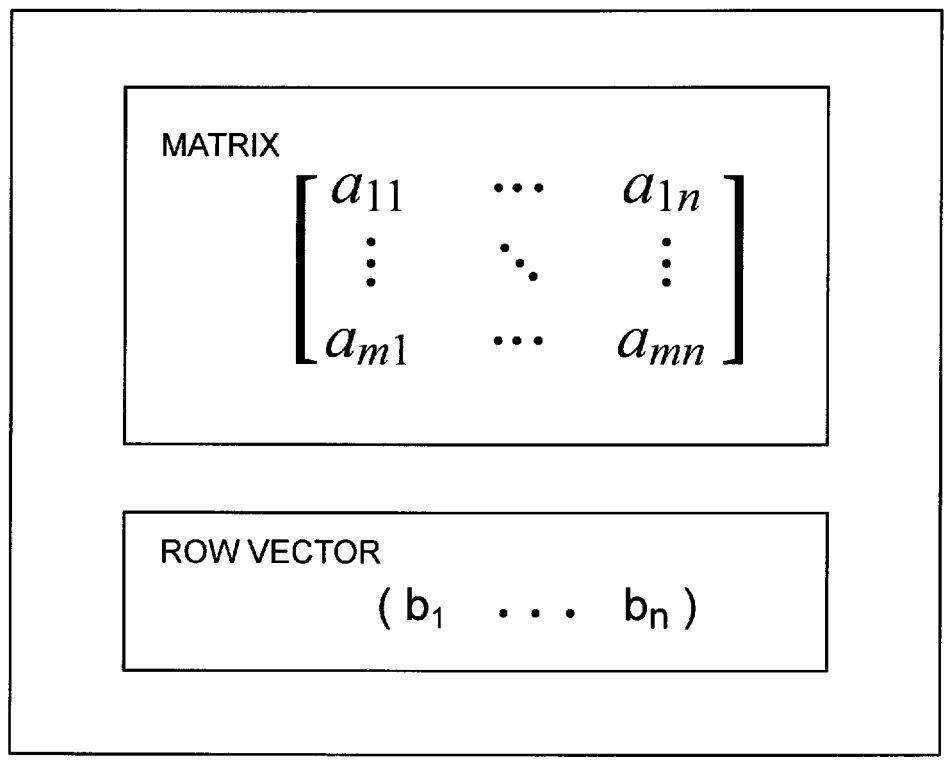
FIG. 9 is a block diagram showing an outline of a data structure according to the present invention.
Figure 14:
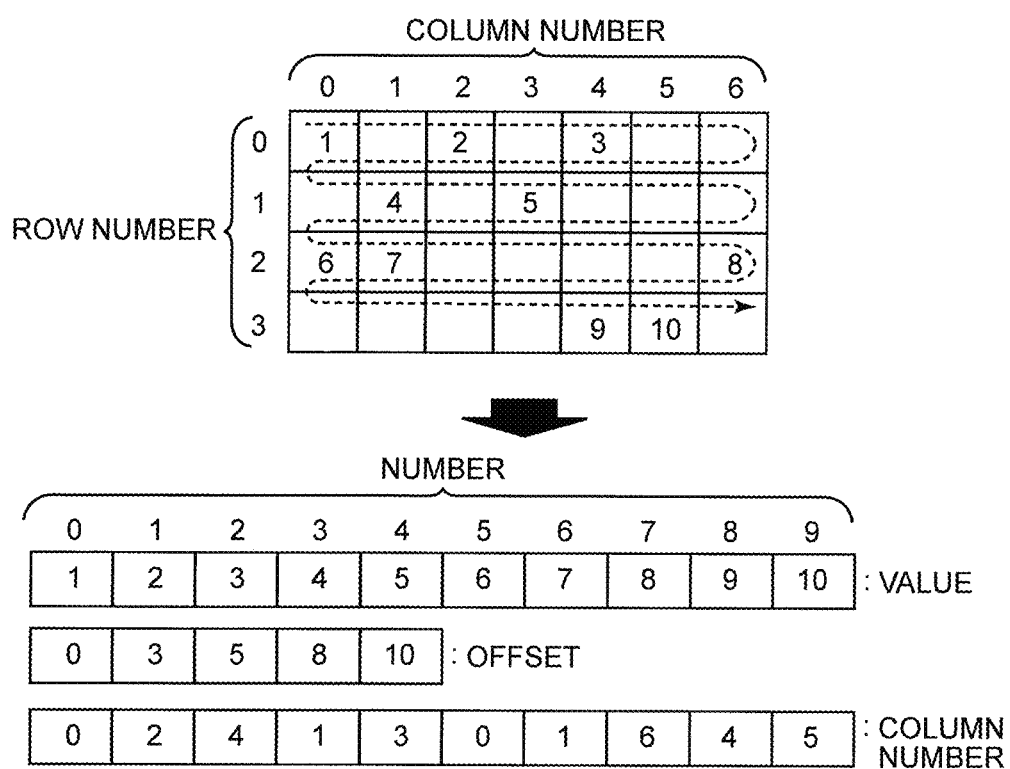
FIG. 14 is an explanatory diagram showing an example of a sparse matrix format.

Furthermore, FIG. 9 is a block diagram showing an outline of a data structure according to the present invention. The data structure according to the present invention includes a matrix generated by, for each column of a target matrix to be standardized, computation process to be performed to compute the average and standard deviation of the value of each component of the column, and first dividing process to be performed to divide the value of each component of the column by the standard deviation computed on the basis of the column; and a row vector generated by quotients computed by performing, for each column of the target matrix, the second dividing process to divide the average computed on the basis of the column by the standard deviation computed on the basis of the column arranged in a row in the order of the columns of the target matrix from which the quotients are computed.

With such a configuration, the data structure can provide standardized training data while preserving its sparse nature.

Furthermore, FIG. 10 is a block diagram showing another outline of a data structure according to the present invention. The data structure according to the present invention includes a matrix generated by, for each row of a target matrix to be standardized, computation process to be performed to compute the average and standard deviation of the value of each component of the row, and first dividing process to be performed to divide the value of each component of the row by the standard deviation computed on the basis of the row; and a column vector generated by quotients computed by performing, for each row of the target matrix, the second dividing process to divide the average computed on the basis of the row by the standard deviation computed on the basis of the row arranged in a column in the order of the rows of the target matrix from which the quotients are computed.

With such a configuration, the data structure can provide standardized training data while preserving its sparse nature.

The invention of the present application has been described above with reference to the exemplary embodiments, but the invention of the present application is not limited to the exemplary embodiments that have been described above. Various changes that those skilled in the art could understand without departing from the scope of the invention of the present application can be made to a configuration and details of the invention of the present application.

Furthermore, part or all of the exemplary embodiments described above can also be described as described in the following supplementary notes, but the invention of the present application is not limited to the following.

(Supplementary note 1) A sparse matrix standardization device including: a computation unit which performs, for each column of a target matrix to be standardized, a computation process to compute the average and standard deviation of the value of each component of the column; a first dividing unit which performs, for each column of the target matrix, a first dividing process to divide the value of each component of the column by the standard deviation computed on the basis of the column; a second dividing unit which performs, for each column of the target matrix, a second dividing process to divide the average computed on the basis of the column by the standard deviation computed on the basis of the column; and a generation unit which arranges the quotients computed by a plurality of second dividing processes, in a row in the order of the columns of the target matrix from which the quotients are computed, thereby generating a row vector.

(Supplementary note 2) The sparse matrix standardization device according to supplementary note 1, including: a storage unit which stores data consisting of a matrix generated by performing a plurality of first dividing processes and the generated row vector, as standardization data, which is data in which the target matrix has been standardized.

(Supplementary note 3) The sparse matrix standardization device according to supplementary note 2, including: a computation unit which computes the product of the standardization data and the first column vector, in which the computation unit performs: computing the second column vector, which is the product of the matrix included the standardization data and the first column vector; computing the scalar value, which is the product of the row vector included the standardization data and the first column vector; subtracting the computed scalar value from the value of each component of the computed second column vector; and outputting the second column vector, in which the scalar value is subtracted from the value of each component, as the product of the standardization data and the first column vector.

(Supplementary note 4) A sparse matrix standardization device including: a computation unit which performs, for each row of a target matrix to be standardized, a computation process to compute the average and standard deviation of the value of each component of the row; a first dividing unit which performs, for each row of the target matrix, a first dividing process to divide the value of each component of the row by the standard deviation computed on the basis of the row; a second dividing unit which performs, for each row of the target matrix, a second dividing process to divide the average computed on the basis of the row by the standard deviation computed on the basis of the row; and a generation unit which arranges the quotients computed by a plurality of second dividing processes, in a column in the order of the rows of the target matrix from which the quotients are computed, thereby generating a column vector.

(Supplementary note 5) The sparse matrix standardization device according to supplementary note 4, including: a storage unit which stores data consisting of a matrix generated by performing a plurality of first dividing processes and the generated column vector, as standardization data, which is data in which the target matrix has been standardized.

(Supplementary note 6) The sparse matrix standardization device according to supplementary note 5, including: a computation unit which computes the product of the standardization data and the first column vector, in which the computation unit performs: computing the second column vector, which is the product of the matrix included the standardization data and the first column vector; computing a third column vector in which each product of the value of each component of the column vector included the standardization data multiplied by −1 and the sum of the value of each component of the first column vector is the value of each component; and outputting the sum of the computed second column vector and the computed third column vector as the product of the standardization data and the first column vector.

(Supplementary note 7) A sparse matrix standardization device including: a computation unit which performs, for each column of a target matrix to be standardized, a computation process to compute the average of the value of each component of the column; and a generation unit which arranges the averages computed by a plurality of computation processes, in a row in the order of the columns of the target matrix from which the averages are computed, thereby generating a row vector.

(Supplementary note 8) A sparse matrix standardization device including: a computation unit which performs, for each row of a target matrix to be standardized, a computation process to compute the average of the value of each component of the row; and a generation unit which arranges the averages computed by a plurality of computation processes, in a column in the order of the rows of the target matrix from which the averages are computed, thereby generating a column vector.

(Supplementary note 9) A sparse matrix standardization method including: performing, for each column of a target matrix to be standardized, a computation process to compute the average and standard deviation of the value of each component of the column; performing, for each column of the target matrix, a first dividing process to divide the value of each component of the column by the standard deviation computed on the basis of the column; performing, for each column of the target matrix, a second dividing process to divide the average computed on the basis of the column by the standard deviation computed on the basis of the column; and arranging the quotients computed by a plurality of second dividing processes, in a row in the order of the columns of the target matrix from which the quotients are computed, thereby generating a row vector.

(Supplementary note 10) The sparse matrix standardization method according to supplementary note 9, including: storing data consisting of a matrix generated by performing a plurality of first dividing processes and the generated row vector, as standardization data, which is data in which the target matrix has been standardized, in a storage unit.

(Supplementary note 11) The sparse matrix standardization method according to supplementary note 10, including: computing the second column vector, which is the product of the matrix included the standardization data and the first column vector; computing the scalar value, which is the product of the row vector included the standardization data and the first column vector; subtracting the computed scalar value from the value of each component of the computed second column vector; and outputting the second column vector, in which the scalar value is subtracted from the value of each component, as the product of the standardization data and the first column vector.

(Supplementary note 12) A sparse matrix standardization method including: performing, for each row of a target matrix to be standardized, a computation process to compute the average and standard deviation of the value of each component of the row; performing, for each row of the target matrix, a first dividing process to divide the value of each component of the row by the standard deviation computed on the basis of the row; performing, for each row of the target matrix, a second dividing process to divide the average computed on the basis of the row by the standard deviation computed on the basis of the row; and arranging the quotients computed by a plurality of second dividing processes, in a column in the order of the rows of the target matrix from which the quotients are computed, thereby generating a column vector.

(Supplementary note 13) The sparse matrix standardization method according to supplementary note 12, including: storing data consisting of a matrix generated by performing a plurality of first dividing processes and the generated column vector, as standardization data, which is data in which the target matrix has been standardized, in a storage unit.

(Supplementary note 14) The sparse matrix standardization method according to supplementary note 13, including: computing the second column vector, which is the product of the matrix included the standardization data and the first column vector; computing a third column vector in which each product of the value of each component of the column vector included the standardization data multiplied by −1 and the sum of the value of each component of the first column vector is the value of each component; and outputting the sum of the computed second column vector and the computed third column vector as the product of the standardization data and the first column vector.

(Supplementary note 15) A sparse matrix standardization program that causes a computer to perform processing including: computation process for performing, for each column of a target matrix to be standardized, a process to compute the average and standard deviation of the value of each component of the column; first dividing process for performing, for each column of the target matrix, a process to divide the value of each component of the column by the standard deviation computed on the basis of the column; second dividing process for performing, for each column of the target matrix, a process to divide the average computed on the basis of the column by the standard deviation computed on the basis of the column; and generation process for arranging the quotients computed by the second dividing process, in a row in the order of the columns of the target matrix from which the quotients are computed, thereby generating a row vector.

(Supplementary note 16) The sparse matrix standardization program according to supplementary note 15, causes the computer to perform processing including: storing process for storing data consisting of a matrix generated by performing the first dividing process and the generated row vector, as standardization data, which is data in which the target matrix has been standardized, in a storage unit.

(Supplementary note 17) The sparse matrix standardization program according to supplementary note 16, causes the computer to perform processing including: first computation process for computing the second column vector, which is the product of the matrix included the standardization data and the first column vector; second computation process for computing the scalar value, which is the product of the row vector included the standardization data and the first column vector; subtraction process for subtracting the computed scalar value in the second computation process from the value of each component of the computed second column vector in the first computation process; and output process for outputting the column vector generated by the subtraction process as the product of the standardization data and the first column vector.

(Supplementary note 18) A sparse matrix standardization program that causes a computer to perform processing including: computation process for performing, for each row of a target matrix to be standardized, a process to compute the average and standard deviation of the value of each component of the row; first dividing process for performing, for each row of the target matrix, a process to divide the value of each component of the row by the standard deviation computed on the basis of the row; second dividing process for performing, for each row of the target matrix, a process to divide the average computed on the basis of the row by the standard deviation computed on the basis of the row; and generation process for arranging the quotients computed by the second dividing process, in a column in the order of the rows of the target matrix from which the quotients are computed, thereby generating a column vector.

(Supplementary note 19) The sparse matrix standardization program according to supplementary note 18, causes the computer to perform processing including: storing process for storing data consisting of a matrix generated by performing the first dividing process and the generated column vector, as standardization data, which is data in which the target matrix has been standardized, in a storage unit.

(Supplementary note 20) The sparse matrix standardization program according to supplementary note 19, causes the computer to perform processing including: first computation process for computing the second column vector, which is the product of the matrix included the standardization data and the first column vector; second computation process for computing a third column vector in which each product of the value of each component of the column vector included the standardization data multiplied by −1 and the sum of the value of each component of the first column vector is the value of each component; and output process for outputting the sum of the second column vector computed in the first computation process and the third column vector computed in the second computation process as the product of the standardization data and the first column vector.

(Supplementary note 21) A data structure including: a matrix generated by, for each column of a target matrix to be standardized, computation process to be performed to compute the average and standard deviation of the value of each component of the column, and first dividing process to be performed to divide the value of each component of the column by the standard deviation computed on the basis of the column; and a row vector generated by quotients computed by performing, for each column of the target matrix, the second dividing process to divide the average computed on the basis of the column by the standard deviation computed on the basis of the column arranged in a row in the order of the columns of the target matrix from which the quotients are computed.

(Supplementary note 22) A data structure including: a matrix generated by, for each row of a target matrix to be standardized, computation process to be performed to compute the average and standard deviation of the value of each component of the row, and first dividing process to be performed to divide the value of each component of the row by the standard deviation computed on the basis of the row; and a column vector generated by quotients computed by performing, for each row of the target matrix, the second dividing process to divide the average computed on the basis of the row by the standard deviation computed on the basis of the row arranged in a column in the order of the rows of the target matrix from which the quotients are computed.

REFERENCE SIGNS LIST 10, 100 Sparse matrix standardization device
11, 140 Computation unit
12 First dividing unit
13 Second dividing unit
14 Generation unit
101 CPU
102 Main memory unit
103 Communication unit
104 Auxiliary memory unit
105 Input unit
106 Output unit
107 System bus
110 Standardization unit
120 Sparse matrix storage unit
130 Average vector storage unit

What is claimed is:
1. A sparse matrix standardization device comprising:
a memory storing instructions; and
one or more processors configured to execute the instructions to:
perform, for each column of a sparse target matrix to be standardized and that is training data in machine learn- ing, a computation process to compute an average and a standard deviation of a value of each component of the column;

perform, for each column of the sparse target matrix, a first dividing process to divide the value of each component of the column by the standard deviation computed on the basis of the column;

perform, for each column of the sparse target matrix, a second dividing process to divide the average computed on the basis of the column by the standard deviation computed on the basis of the column; and arrange quotients computed by the second dividing process, in each row of the sparse target matrix in order of the columns from which the quotients are computed, to generate a row vector; and a storage device configured to store, as the standardized sparse target matrix, a matrix computed by the first dividing process and the row vector generated for each row of the sparse target matrix.

2. The sparse matrix standardization device according to claim 1, wherein the one or more processors are configured to further execute the software instructions to compute a product of standardization data and a first column vector, the standardization data being the standardized sparse target matrix, by:

computing a second column vector, which is the product of a matrix included in the standardization data and the first column vector;

computing the scalar value, which is the product of the row vector included in the standardization data and the first column vector;

subtracting the computed scalar value from the value of each component of the computed second column vector; and outputting the second column vector, in which the scalar value is subtracted from the value of each component, as the product of the standardization data and the first column vector.

3. The sparse matrix standardization device according to claim 2, wherein the storage device includes a sparse matrix storage which stores data including the standardized sparse target matrix and an average vector storage which stores the first and second column vectors.

4. The sparse matrix standardization device according to claim 1, wherein the standardization data is utilized as training data in machine learning, the standardization data being the standardized sparse target matrix.

5. A sparse matrix standardization device comprising:
a memory storing instructions, and
one or more processors configured to execute the instructions to perform, for each row of a sparse target matrix to be standardized and that is training data in machine learning, a computation process to compute an average and a standard deviation of a value of each component of the row;

perform, for each row of the sparse target matrix, a first dividing process to divide the value of each component of the row by the standard deviation computed on the basis of the row;

perform, for each row of the sparse target matrix, a second dividing process to divide the average computed on the basis of the row by the standard deviation computed on the basis of the row; and arrange quotients computed by the second dividing process, in each column of the sparse target matrix in order of the rows from which the quotients are computed, to generate a column vector;

a storage unit configured to stored, as the standardized sparse target matrix, a matrix computed by the first dividing process and the column vector generated for each column of the sparse target matrix.

6. The sparse matrix standardization device according to claim 5, wherein the one or more processors are configured to further execute the software instructions to compute a product of standardization data and a first column vector, the standardization data being the standardized sparse target matrix, by:

computing a second column vector, which is the product of a matrix included in the standardization data and the first column vector;

computing a third column vector in which each product of a value of each component of the column vector included in the standardization data multiplied by −1 and a sum of the value of each component of the first column vector is the value of each component; and output a sum of the computed second column vector and the computed third column vector as the product of the standardization data and the first column vector.

7. The sparse matrix standardization device according to claim 6, wherein the storage device includes a sparse matrix storage which stores data including the standardized sparse target matrix and an average vector storage which stores the first, second, and third column vectors.

8. The sparse matrix standardization device according to claim 5, wherein the standardization data is utilized as training data in machine learning, the standardization data being the standardized sparse target matrix.

* * * * *